United States Patent [19]

Christy et al.

[11] Patent Number: 4,665,404
[45] Date of Patent: May 12, 1987

[54] HIGH FREQUENCY SPREAD SPECTRUM POSITIONING SYSTEM AND METHOD THEREFOR

[75] Inventors: Edmund H. Christy, Metairie; Robert E. Rouquette, New Orleans, both of La.; Lawrence Van Doren, San Diego, Calif.

[73] Assignee: Offshore Navigation, Inc., Harahan, La.

[21] Appl. No.: 662,889

[22] Filed: Oct. 19, 1984

Related U.S. Application Data

[63] Continuation-in-part of Ser. No. 544,886, Oct. 24, 1983.

[51] Int. Cl.⁴ ............................................. G01S 1/24
[52] U.S. Cl. .................................... 342/463; 342/421
[58] Field of Search .................. 343/6.5 R, 6.8 R, 7.5, 343/356, 357, 394, 421, 463, 387; 364/423, 449, 452, 458; 375/1.5, 1; 342/142-151; 356/357, 394; 421/463

[56] References Cited

U.S. PATENT DOCUMENTS

| | | | |
|---|---|---|---|
| 3,402,265 | 9/1968 | Couvillon et al. | 375/115 |
| 3,534,367 | 10/1970 | Laughlin et al. | 343/456 |
| 3,714,573 | 1/1973 | Grossman | 343/387 |
| 3,755,816 | 8/1973 | Kratzer | 343/458 |
| 3,852,750 | 12/1974 | Klein | 343/396 |
| 3,883,873 | 5/1975 | Mosyakov et al. | 343/385 |
| 3,900,876 | 8/1975 | Tsukada et al. | 343/396 |
| 3,916,410 | 10/1975 | Elwood | 364/452 X |
| 3,943,509 | 3/1976 | Pudsey | 343/6.5 R |
| 4,095,226 | 6/1978 | Kratzer | 343/393 |
| 4,114,155 | 9/1978 | Raab | 343/394 |
| 4,122,393 | 10/1978 | Gordy et al. | 375/115 X |
| 4,301,537 | 11/1981 | Roos | 375/115 X |
| 4,423,419 | 12/1983 | Johannessen | 343/387 |
| 4,445,118 | 4/1984 | Taylor et al. | 343/357 |

FOREIGN PATENT DOCUMENTS 0084004 7/1983 European Pat. Off. .
2248517 5/1975 France .

Primary Examiner—Thomas H. Tarcza
Assistant Examiner—Bernarr Earl Gregory
Attorney, Agent, or Firm—Schwartz, Jeffery, Schwaab, Mack, Blumenthal & Evans

[57] ABSTRACT

The system includes a method and apparatus for transmitting a spread spectrum signal from each of a plurality of base stations. The spread spectrum signal has a predetermined timing and has a ground wave component and a sky wave component. The signal is transmitted with a repetition time at least as great as a maximum anticipated delay time of the sky wave component such that the ground wave component of the transmitted spread spectrum signal can be distinguished from the sky wave component. The signal is detected at each of a plurality of mobile stations and the timing of the detected signal is compared to a local timing signal. The phase difference between these signals is indicative of the range of the base station from the mobile station.

41 Claims, 19 Drawing Figures

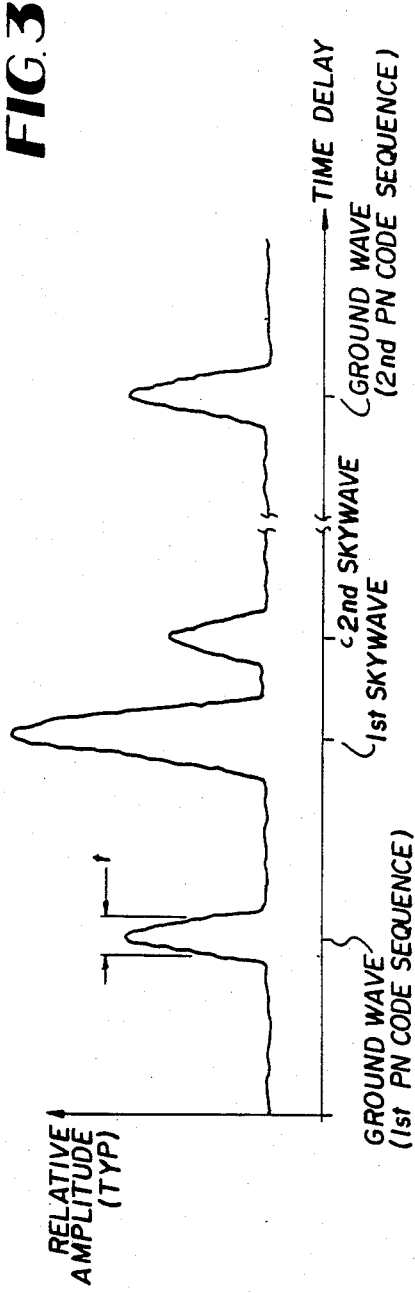

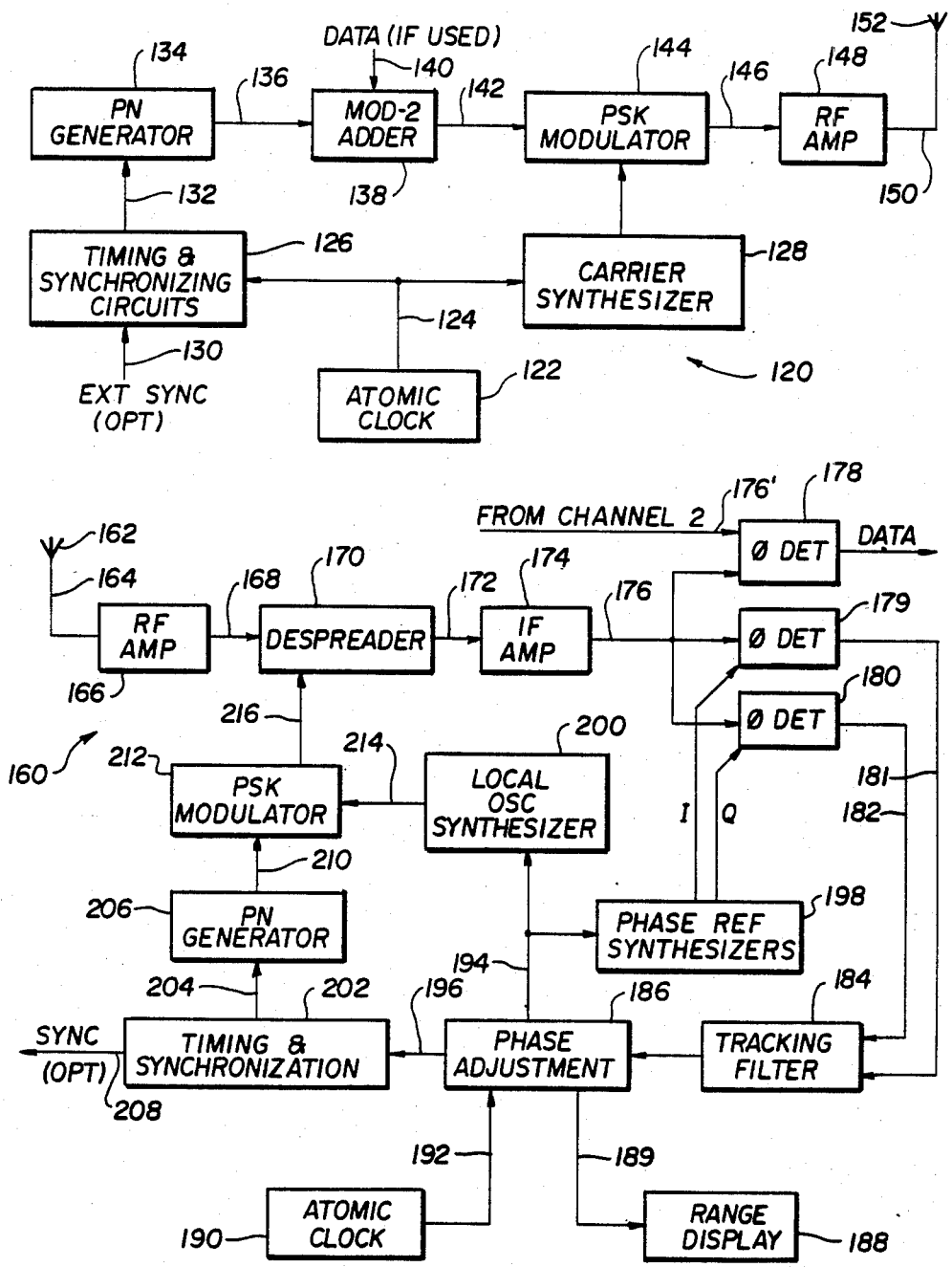

SPREAD SPECTRUM
RECEIVER

SPECTRAL ANALYSIS / TRAP SET PROCEDURE

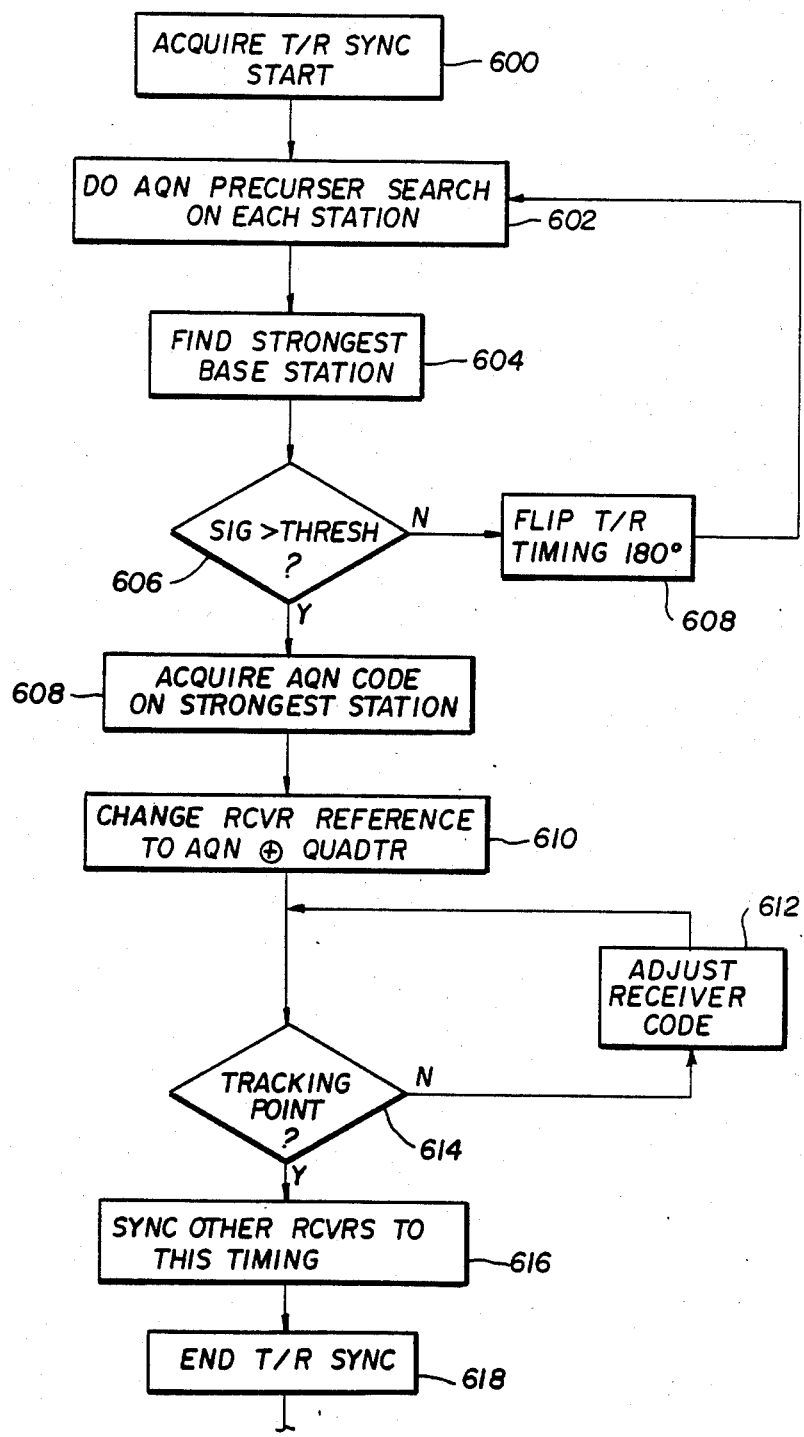

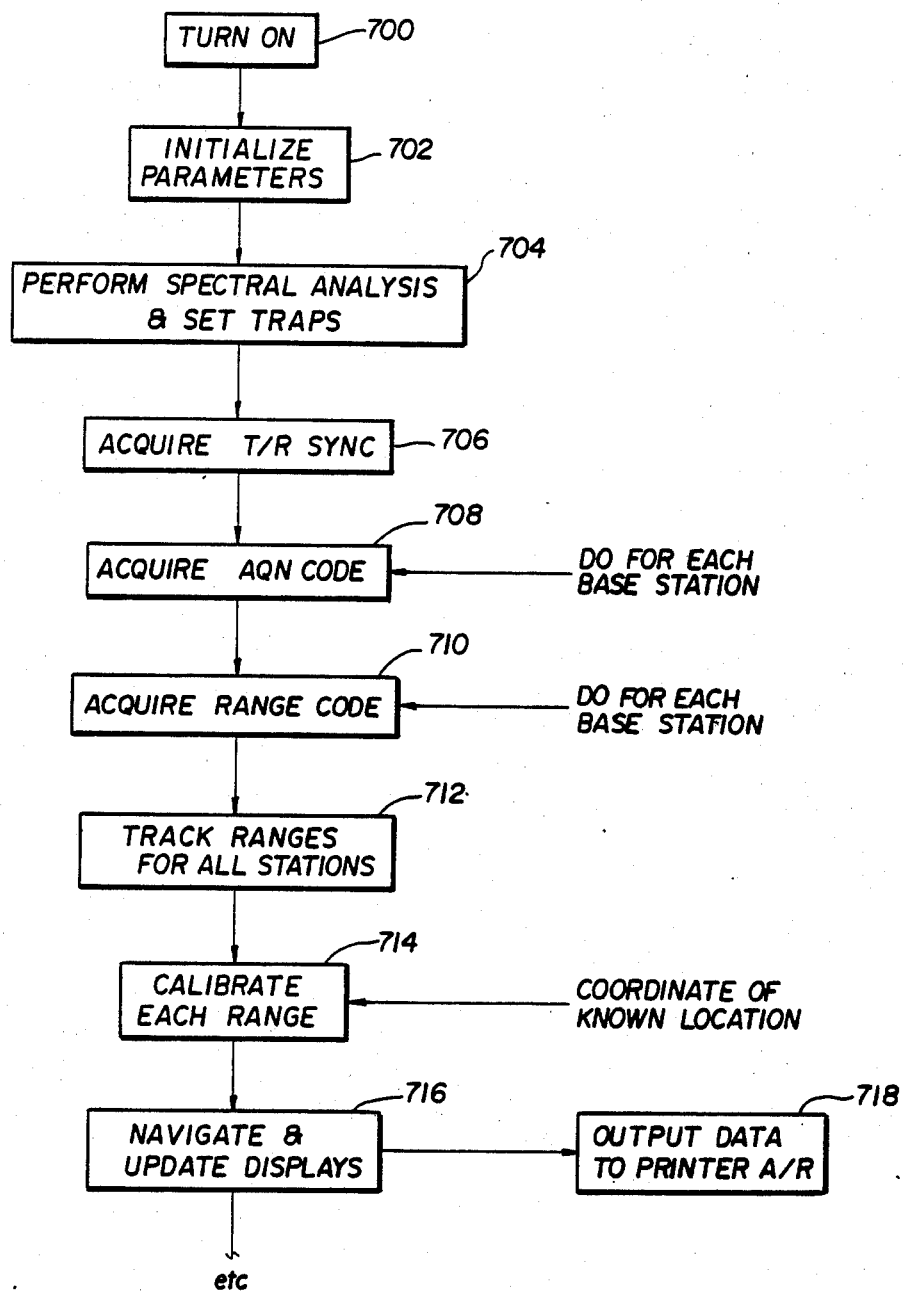

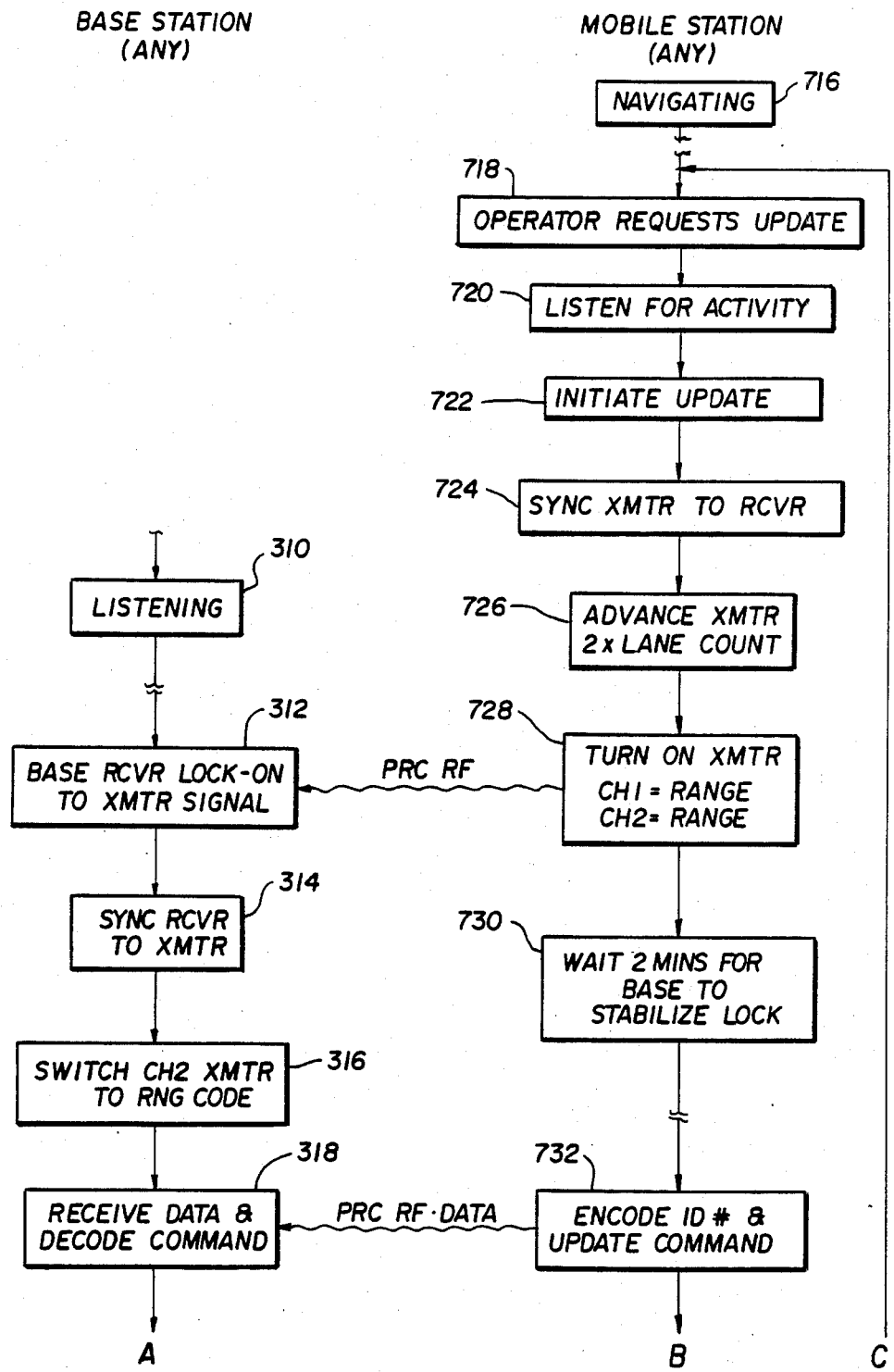

HIGH FREQUENCY SPREAD SPECTRUM POSITIONING SYSTEM AND METHOD THEREFOR

CROSS REFERENCE TO RELATED APPLICATION

This is a Continuation-In-Part of Ser. No. 544,886, filed Oct. 24, 1983.

BACKGROUND OF THE INVENTION

The present invention relates to systems for determining the position of mobile stations relative to base stations, and particularly to such systems which employ pseudorandom noise code signals emitted from known base stations and received by the mobile stations.

Various positioning systems are known, such as, for example, radio navigation systems in which timed signals at differing frequencies are transmitted from a plurality of base stattions and received by mobile stations. The received signals are compared to a locally generated reference signal on each mobile station and a range determination is made relative to each base station. These systems include Loran-C, Raydist, Argo, Shoran and Transit.

Loran-C is a pulsed 100 KHz technique that takes advantage of the low propagation loss at low frequencies but suffers from range inaccuracies of 200 feet or more at 500 miles.

Raydist is a continuous wave phase measurement technique at 2000 KHz that also takes advantage of low propagation loss but with increased distance accuracy due to a higher carrier frequency relative to Loran-C. Over the horizon accuracies of a few meters are practical. This system suffers from overwhelming skywaves at long distances and at night-day transitions causing loss of ranging data without the ability to reacquire range when the signal returns.

Argo is a pulsed, phase comparison system at high frequencies having similar skywave propagation problems to Raydist.

Shoran, as well as Maxiran, and Trisponder are UHF Pulse Systems that provide 5 to 15 feet range accuracy over line of sight pathss, 50 to 75 feet range accuracy over the horizon to 150 miles in polar latitudes and occasionally 300 miles in tropical latitudes. The long range usefulness of these systems suffers from intermittent operation being dependent upon the presence of atmospheric ducts for its signals at ranges beyond 60 to 100 miles.

Transit is a Navy navigational satellite system which offers unlimited range but whose position fixes are intermittent due to the flyby nature of the satellite and therefore not useable for continuous precision positioning.

The continuing search for offshore oil sources has been pushing further offshore each year. This search requires precision navigation to allow accurate dynamic exploration measurements such as seismic surveys, bottom profiling and relocation of previously drilled wellheads at long distances from reference points. An accurate navigation system for this type of application must be capable of making range measurements out to at least 400 miles, handle boat speeds of up to 10 to 20 knots, and be repeatable in range tolerances of + or −20 feet. It is also desirable that such a system be capable of operation 24 hours per day, have no range ambiguities within 400 miles, have data link capability for integration with other systems, and be capable of simultaneous operation with several users. None of the known systems are able to fulfill all of these criteria.

Presently, a high accuracy global position system (GPS) is being developed which uses pseudorandom type signals generated by a plurality of satellites for deriving positioning information on the earth. U.S. Pat. No. 4,114,155 to Raab shows an example of a receiver used to interpret the pseudorandom satellite generated signals. However, the obtainable accuracy from a GPS system is marginal with respect to current requirements, and, as a military system, may not be available for general use.

U.S. Pat. No. 3,714,573 to Grossman shows a spread spectrum system capable of monitoring the positions of vehicles. In the Grossman system, each vehicle contains apparatus which repetively transmitts a uniquely coded spread spectrum identification signal asynchronous to the repetitive identification signals transmitted by all other system vehicles. However, the Grossman system only allows the position of each vehicle to be monitored at a central location; no provision is made for the vehicles to be able to monitor their own positions as is required in offshore navigation.

SUMMARY OF THE INVENTION

One object of the present invention is to provide a system which can simultaneously produce positioning data for a plurality of mobile stations relative to the position of known base stations.

Another object of the present invention is to provide a positioning system which is capable of making range measuremenfts up to 400 miles.

A further object of the present invention is to provide a positioning system which can handle boat speeds up to 20 knots.

Yet another object of the present invention is to provide a positioning system which is capable of producing repeatable range tolerances of + or −20 feet.

A still further object of the present invention is to provide a positioning system capable of operation 24 hours a day.

Another object of the present invention is to provide a positioning system which can be operated to produce no range ambiguities within 400 miles.

A further object of the present invention is to provide a positioning system which has a data link capability for integration with other systems.

In accordance with the above and other objects, the present invention is a system for enabling a plurality of mobile stations to make position determinations relative to at least two base stations. Each base station comprises a base station clock having a predetermined timing, and means synchronized with the base station clock for transmitting a spread spectrum signal having a ground wave component and a skywave component. The spread spectrum signal has a repetition time which is at least as great as a maximum anticipated delay time of the spread spectrum skywave component whereby the ground wave component of the spread spectrum signal can be distinguished from the skywave component. Each of the mobile stations, for each base station, comprises a mobile station clock synchronized with the base station clock and detection means for receiving the spread spectrum signal, despreading the received signal and outputting a detected despread signal. Means are provided for comparing the detected, despread signal to the mobile station clock for producing a phase difference signal indicative of range from the base station. Each of the base station spread spectrum signals is centered at a different frequency or makes use of a different code, so that a plurality of ranges can be determined simultaneously from the individual base stations and used to determine the location of the mobile stations.

In accordance with other aspects of the invention, the transmitting means comprises means for generating a pseudorandom noise code, means for generating a carrier signal, and means for modulating the carrier signal with the pseudorandom noise code.

The carrier signal is at a frequency preferably in the 1 to 4 MHz range but could be any frequency less than 60 MHz.

The pseudorandom noise code has a repetition time which is greater than the expected delay time of the skywave and has a chip time which is less than the skywave delay time in order to make it possible to distinguish the actual groundwave code from skywave delayed versions of the code.

In order to filter out narrow band interference, a notch filter may be included in the detection means together with a means for analyzing the received signal and matching the stop band of the notch filter to the narrow band interference.

In order to permit unambiguous range measurements, the unambiguous length of the pseudorandom noise code should be not less than the maximum expected range to be measured. This range is approximately 400 miles. A certain level of ambiguity can be permitted and thus the ambiguous length of the pseudorandom code could be chosen to be not less than one-fourth of the maximum expected range to be measured.

Each base station is also able to communicate with each mobile station and includes means for adding digital communication data to the pseudorandom noise code. Each detection means includes means for identifying the digital communication data.

In accordance with other aspects, the adding means produces a recognizable phase shift of the transmitted spread spectrum signal to distinguish each bit of the digital communication data, and the means for identifying the digital communication data comprises a phase detector.

Each mobile station can also include a mobile station transmitter and each base station can include a base station receiver tuned to receive signals transmitted by the mobile station transmitter.

The mobile station transmitter can be operative to transmit a signal to the base station receiver indicative of the timing of the mobile station clock. The base station includes means for comparing the phase of the mobile station clock timing with the phase of the base station clock and generating a signal indicative of the phase difference therebetween. The adding means is connected to receive the phase difference signal to transmit this phase difference signal to the mobile station. The mobile station is able to use the phase difference signal to maintain accurate synchronization between the mobile station clock and the base station clock. This signal is also a redundant indication of the range between the base station and mobile station and can be used to correct any inaccuracies in the mobile station measured range.

Each mobile station transmitter transmits a pseudorandom noise code at a different frequency or with a different code than the pseudorandom noise codes transmitted by the base stations.

In order to reduce interference between transmitted and received signals, each base station includes means for permitting transmission of the spread spectrum signal only during transmit periods of a predetermined length, and the transmit periods are followed by receive periods during which the base station is capable of receiving signals on the base station receiver. Each transmit period has a duration equal to a plurality of repetition times of the spread spectrum signal. Preferably, each transmit period is equal to approximately 8 repetition times of the pseudorandom noise code.

The mobile stations also have transmit and receive periods. The mobile station transmit and receive periods are 180 degrees out of phase with the base station transmit and receive periods.

The present invention also includes the method for enabling a plurality of mobile stations to make position determinations relative to at least two base stations. The method comprises the transmission by each base station of a spread spectrum signal having a predetermined timing, having a ground wave component and a skywave component, and having a repetition time at least as great as a maximum anticipated delay time of the sky wave component. The method also includes each mobile station receiving the spread spectrum signal, despreading the received signal and outputting a signal indicative of the timing of the spread sprectrum signal. The mobile stations also distinguish between the first received spread spectrum signal and sky wave and other later received components of the spread spectrum signal, and thereby can lock onto the first received signal. The timing of the spread spectrum signal is compared to a local time indicative signal and the difference therebetween is used to compute a range from the base stations.

In accordance with other aspects of the invention, the method also includes a round trip ranging scheme between one mobile station and any one base station in which the mobile station transmits a signal to the base station, the signal having a predetermined timing indicative of the mobile station measured range. The base station compares the timing of the received signal with its own locally generated timing signal and transmits a signal back to the mobile station indicative of the phase difference therebetween. The mobile station utilizes this phase difference signal to synchronize its timing to that of the base station and to correct its own range measurements. In accordance with other aspects of the invention, the method includes establishing transmit and receive periods at each base station and transmit and receiver periods at the mobile stations wherein the base station transmit and receive periods are synchronized and in phase with each other and the mobile station transmit and receive periods are 180 degrees out of phase with the base station transmit and receive periods.

The method also includes using the transmit and receive periods of a master base station as a coarse synchronization signal to lock other base and mobile stations onto the master station transmitted signal.

BRIEF DESCRIPTION OF THE DRAWINGS

The above and other objects of the invention will become more readily apparent as the invention is more fully disclosed in the detailed description to follow, reference being had to the accompanying drawings in which like reference numerals represent like parts throughout and in which:

FIG. 3 is a graphical representation in which the abscissa is time and the ordinate is relative amplitude, representing the time delay between ground waves and sky waves of a transmitted signal;

FIG. 4 is a graphical representation showing the comparison of the frequencey spectrums of a pulsed signal to a pseudorandom noise code signal;

FIG. 5 is a block diagram of a transmitter according to the present invention;

FIG. 6 is a block diagram of a receiver according to the present invention;

FIG. 16 is a flow diagram depicting the synchronization procedure for acquiring T/R synchronization;

FIG. 17 is a flow diagram depicting turn-on and synchronization procedures for the mobile stations; and FIGS. 18A and 18B show a flow diagram depicting the mobile clock update procedure.

DETAILED DESCRIPTION OF THE PREFERRED EMBODIMENT

Figure 1:
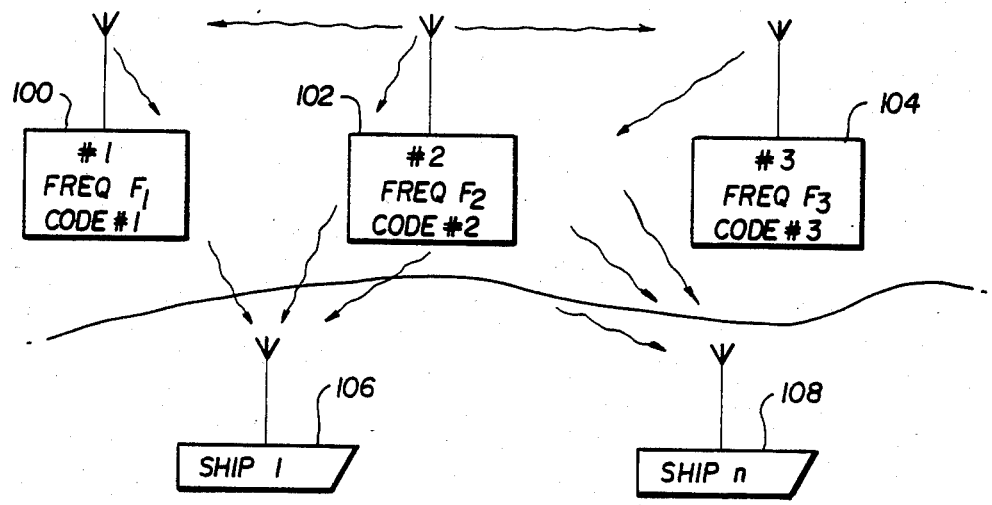
FIG. 1 is a diagrammatic view showing the base stations and mobile stations according to the present invention.

FIG. 1 shows the basic layout of the position determination system of the present invention. The system includes three base stations 100, 102, and 104. Although two base stations are adequate for providing sufficient ranging information to establish the position of a mobile station, three base stations are used in practice in order to increase the accuracy of the system. The third base station also provides a measure of redundancy in the event that one of the other base stations fails. Base stations 100, 102 and 104 can provide positioning information to a large number of mobile stations depicted as ships 106 and 108. Only two ships are depicted to indicate that a plurality of ships can obtain positioning information simultaneously. Naturally, it will be understood that a great many more than two ships can be operating simultaneously.

Figure 2:
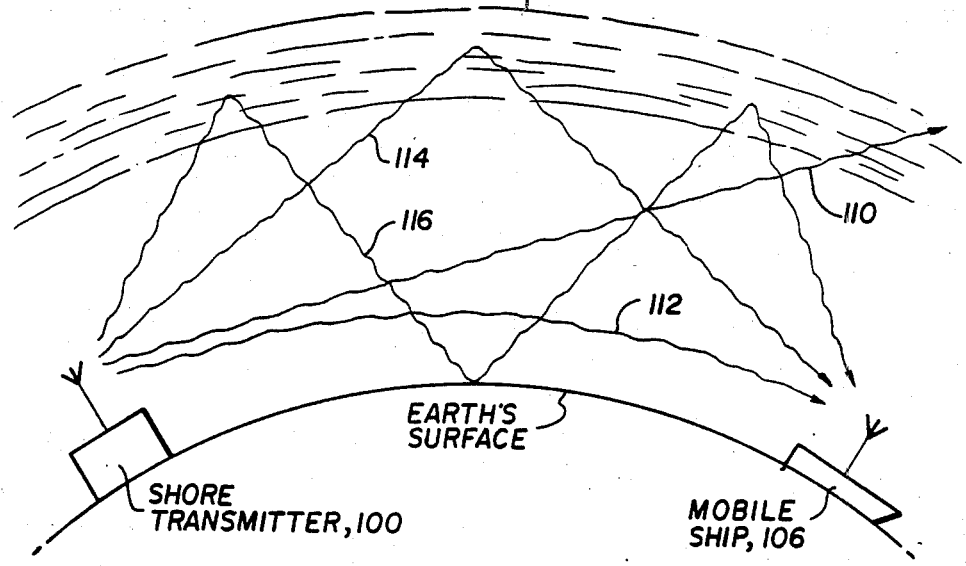
FIG. 2 is a diagrammatic view showing the effect of the earth's atmosphere on transmitted signals and different frequency ranges.
Figure 7:
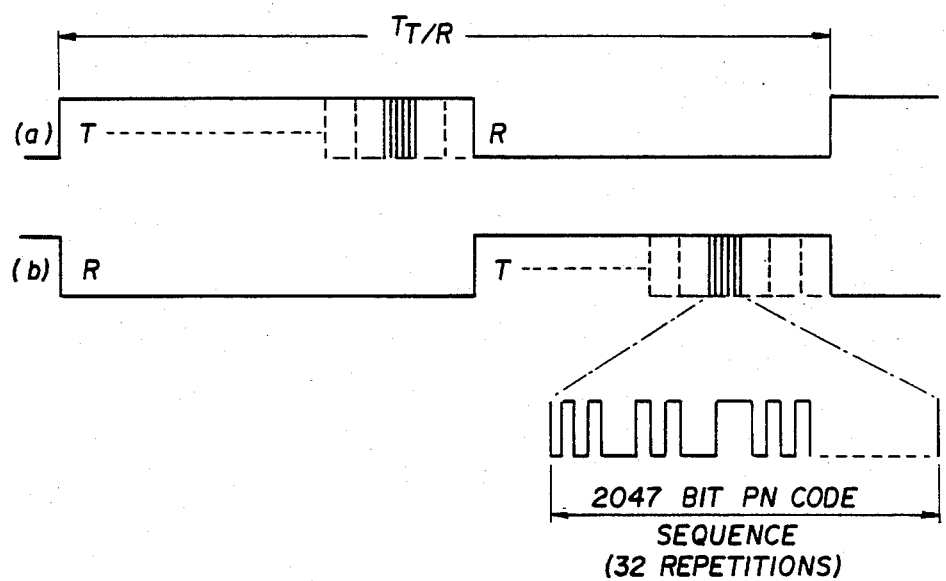
FIG. 7 is a timing diagram showing the transmit and receive periods established in accordance with the present invention.

Various techniques are known for providing ranging information using a base station, mobile station configuration as shown in FIG. 1. One of the significant aspects to be considered in designing such a system is the frequency range of the transmitted signals. Radio frequency waves have different characteristics when propagated through the earth's atmosphere depending on their frequency. FIG. 2 shows schematically some of the gross differences to be expected depending upon the frequency transmitted. FIG. 2 shows transmissions from one base station 100 to one mobile ship 106. If the carrier frequency of the transmitted signal is chosen to be relatively high, approximately 60 MHz or greater, the transmitted signal propagates through the atmosphere in a relatively straight line as depicted by line 110. This type of signal has a disadvantage that it does not follow the earth's curvature and thus the maximum range of the system is determined by the line of sight between the antenna of base station 100 and the antenna of ship 106. This limits the usable range of VHF and UHF systems to 60 to 100 miles unless atmospheric ducts are present to carry the signal beyond this range.

Frequencies below 50 to 60 MHz contain a component shown at 112 in FIG. 3 which follows the earth's curvature and is termed the ground wave component. This component is excellent for providing longer range accuracies; however, these frequency ranges suffer from the deleterious effects of sky wave propagation. That is, a component of the transmitted signal propagates toward the ionosphere and is reflected back to the earth's surface as depicted by propagation line 114 which indicates one reflection from the ionosphere and propagation line 116 which indicates two ionospheric reflections or hops. The sky wave components of signals in these frequency ranges create multipath distortion that can limit the accuracy of a ranging system if no compensation is provided. This fact is depicted by FIG. 3 which shows the relative arrival times at ship 106 for the ground wave component of the transmitted signal, the component designated as the first sky wave which contains a single reflection from the ionosphere, and the component referred to as the second sky-wave which reflects twice from the ionosphere. If, for example, the transmitted signal is a pulse signal, it can be seen from FIG. 3 that three distinct pulses will be received at the ship 106 for each transmitted pulse. The sky wave components of each pulse can easily interfere with the ground wave component of successive pulses thus making signal recognition extremely difficult. Systems employing CW signals suffer more because they cannot distinguish times of arrival at all.

Another problem encountered with, for example, pulsed positioning systems is that a relatively large amount of power is required to be transmitted for each pulse time in order to obtain a usable signal strength at a distance of 400 miles or more. The high power combined with the short pulses cause considerable interferences to other users operating in the same general area of the spectrum.

According to the present invention, a spread spectrum modulation system is used to both reduce required transmitter power and eliminate the effect of sky wave interference. Spread spectrum modulation has statistical properties similar to random noise. Because of the low power density inherent in spread spectrum modulation, recovery of the base band information from the spread spectrum signal can only be accomplished through correlating the received signal with an exact replica of the transmitted signal. Thus, unless the spread spectrum signal is known, the base band information cannot be demodulated. Therefore, spread spectrum systems provide signal privacy in addition to low power requirements and sky wave suppression capability.

The techniques to achieve spread spectrum are direct sequence pseudonoise, frequency hopping, time hopping, and any hybrid of these techniques. Of these, only direct sequence pseudonoise and frequency hopping have significant navigation implications. The direct sequence pseudonoise method is described herein, it being understood that the system of the present invention may be modified to incorporate other spread spectrum techniques.

The most straightforward way to widen the spectrum of a message signal is to multiply (modulate) it by a wide band signal. Such a spreading signal must have correlation properties that aid in acquisition and tracking. One of the best signals that fits these specifications is the binary pseudonoise (PN) signal. Direct sequence PN spreading in conjunction with phase shift keying data modulation is the most common spread spectrum system.

FIG. 4 shows a comparison of the time function, auto correlation, and frequency spectrum of a pseudorandom binary sequence noise code as compared to a pulse signal. Graph A of FIG. 4 depicts the pulse signal having a pulse time of t and pulse spacing of P and Graph B depicts a PN code signal having a chip time of t and a repetition time of Nt where N is the total number of chips in each PN code sequence. The auto correlation function of the pulse signal and the PN code signal are similar with peaks occurring at intervals of P for the pulse signal and Nt for the PN code signal. Even more significantly, the frequency spectrums for the pulse and PN code signals are the same having zero crossing points at 1/t. The pulse signal has spectral lines at intervals of 1/P while the PN code spectral lines are spaced by 1/Nt. Accordingly, it can be seen that by replacing a pulse signal with a PN code signal having a repetition rate Nt equal to the pulse spacing P, the same spectral distribution will be obtained. The major distinction between the pulse and PN code signals is that all of the energy represented by the frequency spectrum of the pulse signal must be contained in a single pulse per cycle whereas the energy in the PN code signal is distributed over N chips. Thus, the amplitude of each chip of the PN code signal can be substantially less than each pulse of the pulse signal and a transmiter having a lower power output can be used.

FIG. 5 shows a block diagram of a transmitter 120 which can be used to generate and transmit a spread spectrum signal according to the present invention. Transmitter 120 includes an atomic clock 122 which outputs a highly accurate timing signal on line 124. This timing signal is received by timing and synchronization circuits 126 and by carrier synthesizer 128. Timing and synchronization circuits 126 also receive an external sync 130 which may be used, for example, to synchronize transmitter 120 with similar transmitters in other base stations. Circuits 126 produce a timing output on line 132 which is received by PN generator 134. Generator 134 produces a PN code signal in binary form having a number of chips and a chip rate determined by the particular application.

Referring again to FIGS. 3 and 4, it will be seen that the auto-correlation function for a PN code has a base width approximately twice the width of one chip of the code. The peak of the auto-correlation has a discernable width approximately equal to the chip width. Accordingly, if several auto-correlations are sensed due to the ground wave and several sky waves, as shown in FIG. 3, the chip width must be less than the time delay between the ground wave and the first received sky wave in order to enable the ground wave to be distinguished from the first received sky wave. This, therefore, indicates that for a typical sky wave delay of approximately 120 microseconds, a chip rate of at least 8 KHz should be maintained. Of course, the greater the spacing between the ground wave and the first sky wave, the easier it is to distinguish the signals. Thus, in practice, a wider spreading rate of 100 KHz is more often used.

The length of the PN codes is dictated both by the delay time of the sky waves and by the maximum unambiguous range measurement which is desired. Again referring to FIG. 3, in order not to confuse the auto-correlation peaks produced by the sky wave of one PN code sequence with ground wave auto-correlation peaks produced by subsequent PN code sequences, it is necessary to insure that the length of the PN code sequence is greater than the maximum anticipated sky wave delay. Also, in order to produce an unambiguous position determination so that the position of a mobile station can be determined without having to return to a known location, as will be discussed in greater detail hereinafter, each PN code sequence when transmitted must have a length equal to at least the length of the maximum range to be measured. Finally, in order to adequately distinguish the transmitted spread spectrum signals from noise and other interference, each PN code sequence must have sufficient chips to render its auto-correlation peak high in relation to uncorrelated noise and interference. A PN code length of 2,047 chips has been found adequate to satisfy all of these criteria. This code length at a chip rate of 100 KHz produces an unambiguous PN code length of 3,800 miles, and, at a chip rate of 16 KHz produces an unambiguous PN code length of 24,000 miles. In both cases, the auto correlation peak is 2,047 times that of uncorrelated noise.

Returning to FIG. 5, it will be understood that PN generator 134 produces a PN code signal having code sequences with 2,047 chips at a chip rate of 100 KHz. This signal is provided on line 136 to a modulo-2 adder 138 to which any available data can be supplied on line 140. Adder 138 can be in the form of an exclusive-OR gate having as inputs lines 136 and 140. Digital data is received on line 140 and this causes a periodic phase reversal of the data on line 136. It should be noted that if data is to be transmitted using adder 138, two transmit channels should be used, designated channels 1 and 2. Channel 1 transmits the PN code with no data added while channel 2 transmits the same PN code with data added. Detection of the data is carried out by comparing the phase of the channel 1 signal with that of the channel 2 signal, as will be described below.

The output of adder 138 is provided on line 142 to a phase shift keying modulator 144 where the signal on line 142 modulates the carrier generated by synthesizer 128. The carrier frequency is of great importance to the system since the carrier signal is compared to a locally generated clock signal on a mobile station to provide a range determination. As discussed above, most frequencies below approximately 60 MHz produce a ground wave component which when transmitted provides sufficient range. However, due to the characteristics of ground wave propagation, frequencies above approximately 4 MHz produce ground waves at 400 miles which are sufficiently weak compared to the sky waves that, although possible, sky wave suppression becomes impractical. Further, frequencies below approximately 1 MHz are in the long wave length region where the necessary range accuracy cannot be obtained. Accordingly, for best results, a frequency should be chose between 1 MHz and 4 MHz. In practice, a frequency of approximately 2 MHz has been used with excellent results. The modulated carrier signal is provided on line 146 to radio frequency amplifier 148 which amplifies the signal to a power level sufficient to reach the range accuracy required. In practice, due to the use of a spread spectrum signal, amplifier 148 can be a power amplifier having an output in the range of 1 to 10 watts. The amplified signal is provided on lined 150 to antenna 152. Antenna 152 can be an 80 to 120 ft. tower when used on a base station or a 20 to 40 ft whip antenna if used on a mobile station.

FIG. 6 shows a block diagram of a receiver 160 which can be used in the present invention. Receiver 160 includes antenna 162 connected to line 164 to radio frequency amplifier 166. Again, if the antenna is on the base station, it may be an 80 to 120 ft. tower while on the mobile stations, 20 to 40 ft. whip antennas are used. The received, amplified signal is passed from amplifier 166 through line 168 to a despreader 170 which forms a cross correlation between the received signal and a locally generated duplicate of the PSK modulated PN code. The output of despreader 170 is in the form of the despread carrier wave having a maximum amplitude when the locally generated PN code matches the received PN code. Such despreaders are well known. The signal from despreader 170 is passed through line 172 to an intermediate frequency amplifier 174. The output of amplifier 174 is passed through line 176 to phase detectors 178, 179 and 180. It should be understood that receiver will have two channels to receive both channel 1 and channel 2. The circuitry in FIG. 6 shows only channel 1, channel 2 being similar and synchronized with channel 1. Phase detector 178 receives inputs from both channel 1 and channel 2, and distinguishes the phase inversions indicative of the data signal whereas phase detectors 179 and 180 measure the in phase and quadrature phase variations of the channel 1 signal indicative of ranging information. The outputs of phase detectors 179 and 180 are passed, respectively, along lines 181 and 182 to tracking filter 184. Phase detectors 179 and 180 output an indication of the amplitude of the signal on line 176. The phase and amplitude signals on lines 181 and 182 are used by tracking filter 184 to control phase adjustment circuits 186. Phase adjustment circuits 186 control a range display 188 through line 189 and receive a clock signal from atomic clock 190 through line 192. Outputs from circuits 186 are passed through lines 194 and 196. The signal on line 194 controls phase reference synthesizer 198 which in turn passes in-phase and quadrature phase signals to phase detectors 178 through 180. The channel 2 signal is inputted from similar circuitry on line 176'. Also, the signal on line 194 is transmitted to local oscillator synthesizer 200. The signal on line 196 is received by timing and synchronization circuits 202 which pass a timing signal through line 204 to a PN generator 206. Circuits 202 also provide a synchronization signal on line 208. The output of PN generator 206 is passed through line 210 to phase shift keying modulator 212. Modulator 212 also receives the output of synthesizer 200 on line 214 and produces on line 216 an output signal which is a PN code modulated 2 MHz signal equivalent to that received by antenna 162. This signal is passed to despreader 170 for cross correlation with the receive signal.

The operation of transmitter 120 and receiver 160 is as follows. Assuming that atomic clocks 122 and 190 are originally in synchronism, the spread spectrum signal transmitted at antenna 152 has a known timing relationship to the atomic clock 190 of receiver 160. When this signal is received by antenna 162, despreader 170 cross correlates the received signal with the locally generated spread spectrum signal on line 216. Despreader 170 also acts as a balanced modulator so that the output of the correlator is only the carrier frequency. The amplified carrier frequency on line 176 is compared with a locally generated signal of the same frequency produced by synthesizers 198. A signal indicative of the phase difference between these two signals indicates the time of travel of the signal transmitted by the base station to the mobile station, which is indicative of range. This phase difference is detected by tracking filter 184. Once the PN code is acquired, tracking filter 184 commands phase adjustment circuit 186 to increase or decrease the phase of timing circuit 202, and synthesizers 200 and 198 so that the locally produced signal is exactly in sync with the received signal. At the same time, phase adjustment circuit 186 translates the phase difference into a lane count indicative of range. The lane count is incremented or decremented depending on the phase difference and displayed by range display 188.

In order to acquire the PN code of the received signal and synchronize it with the locally generated PN code, it is necessary to step through each chip of the PN code produced by generator 206. This is accomplished by tracking filter 184 which may be either a software or hardware block. Tracking filter 184 causes PN generator 202 to step through each chip of the PN code. This is accomplished by periodically commanding a phase change through phase adjustment circuit 186 equal to 1 PN chip time. Tracking filter 184 recognizes correlation peaks such as those shown in FIG. 3 and stores an indication of the code has been stepped through, tracking filter 184 adjusts the phase so as to lock the system onto the first correlation peak. This peak is indicative of the ground wave. Once the base station PN signal is acquired, the lane count can be incremented or decremented as discussed above. The initial lane count determination can be made either by acquiring the base station signal at a known location or by a round tip ranging technique to be discussed hereinafter.

Referring again to FIG. 1, it will be understood that each of the base stations 100, 102 and 104 has its own transmitter 120. The transmitter 120 of each base station transmits on two separate channels, as discussed above. Also, each base may station transmit a different PN code from the other base stations and/or transmit this code at slightly different carrier frequencies than the other stations. Each of the mobile stations such as ships 106 and 108 has a plurality of receivers 106. If three base stations are used, for example, each ship has three receivers 160 with the receivers having two channels each and being tuned, respectively, to the frequencies of the base stations. The receivers are set to generate, respectively, the PN codes of the base stations. These receivers may share certain elements in common such as the atomic clock, antenna, RF amplifier, and power supplies.

Figure 9:
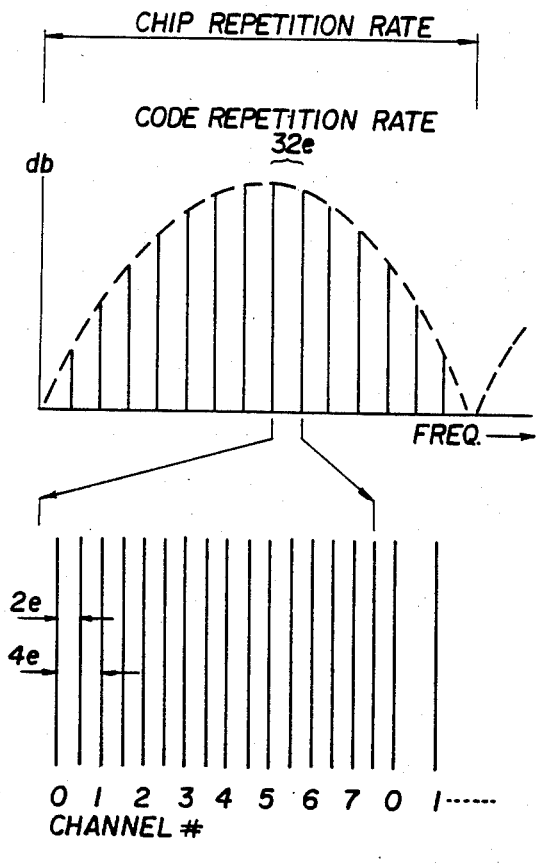
FIG. 9 is a graphical representation in which the abscissa represents frequency and the ordinate represents db, depicting the channel assignments according to the present invention.

In addition, each of the base stations 100, 102 and 104 includes a receiver 160 having two channel each. These receivers are designed to receive spread spectrum sigtwo spectral lines indicates the code repetition rate. If 2e indicates the T/R rate, then the code repetition rate is 32e. As indicated in the lower portion of FIG. 9, the carrier frequencies are assigned to eight channels (0–7).f The channels are spaced by 4e (about 4.8 Hz). Base stations receive on individual even numbered channels and transmit on individual odd numbered channels. The mobile stations do the opposite.

From the discussion above, it will be seen that by separating the channels by 4e, each transmitted signal will have a frequency spectrum in which none of the spectral lines coincide with any of the spectral lines of the other transmitted signals. This greatly increases the ability of the system to distinguish between signals.

Figure 8:
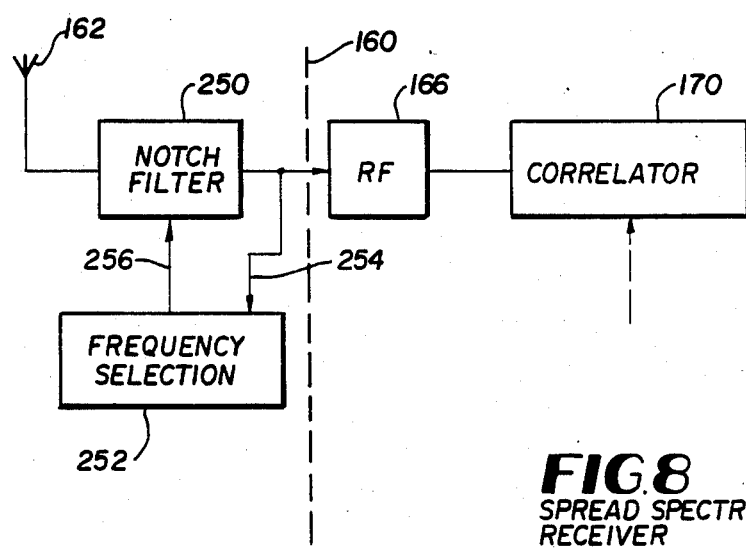
FIG. 8 is a block diagram showing the operation of the notch filter of the present invention.

Interference in the form of strong narrow band signals can hinder the performance of the present invention. As shown in FIG. 8, in order to eliminate such narrow band interference, a notch filter 250 can be placed prior to the RF amplifier 166 of each receiver 160. A spectrum analysis circuit 252 is connected to receive the output of notch filter 250 on line 254 and is connected to control the rejection bond of notch filter 250 on line 256. Frequency selection circuit 252 performs a spectral analysis of the signals received by antenna 162 and analyses the pattern of signals to pick out any signals exceeding a predetermined threshold. Circuit 252 accurately measures the frequency of any such strong interferring signal and sets the rejection band of notch filter 250 to block out the interferring noise. Of course, several notch filters can be provided to eliminate several narrow band interferring signals. After the notch filter has been adjusted, frequency selection circuit 252 analyses the output of the notch filter to verify that the setting is correct. The setting can then be adjusted again and/or additional notch filters set, as necessary.

Figure 10:
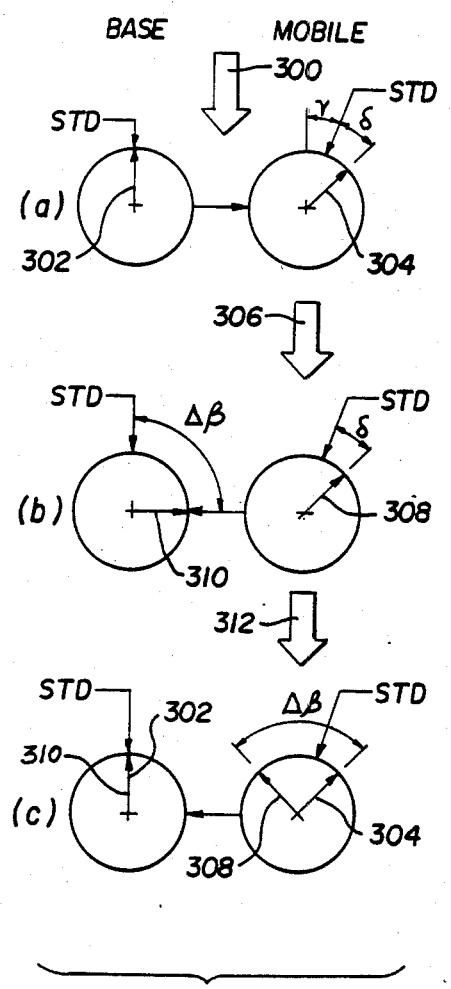
FIG. 10 is a diagram showing the sequence of the clock synchronization mode of the present invention.
Figure 11:
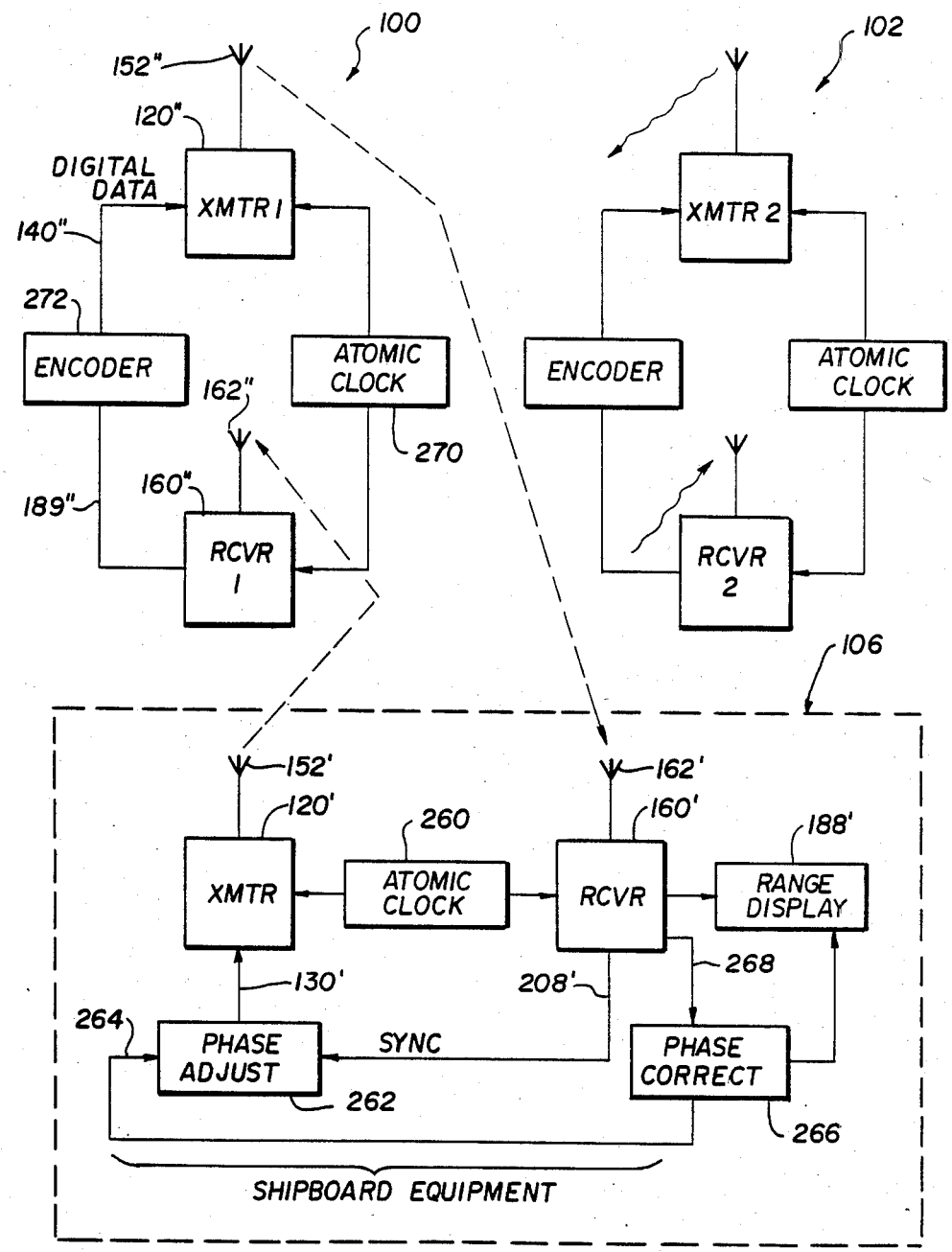
FIG. 11 is a block diagram depicting the operation of the circuit in accordance with the diagram of FIG. 10.

FIGS. 10 and 11 depict the manner in which round trip ranging and clock drift correction are performed.

In FIG. 11, mobile station 106 is shown having a transmitter 120' and a receiver 160'. The transmitter and receiver utilize a single atomic clock 260. As discussed above, the clock signal 260 is compared to the timing of a received signal to provide a phase difference signal indicative of range. This phase difference is provided to a range display circuit 188' and is also used to control the internal timing of the receiver. An indication of this phase difference signal is also provided on synchronization line 208' which connects to a phase adjustment circuit 262. Phase adjustment circuit 262 also receives a signal on line 264 from phase correction circuit 266 which receives the decoded data signal from receiver 160 on line 268. For the sake of clarity of the present explanation, the two channels of each transmitter and receiver are not being referred individually. It will be understood from the foregoing discussion, however, that two channels are used to transmit data.

Transmitter 120" of base station 100 operates as discussed above to transmit a pseudorandom noise code signal from antenna 152". Receiver 160" accepts pseudorandom noise code signals on antenna 162" and outputs on line 189" a signal indicative of the phase of the received signal relative to the phase of the base station atomic clock 270. It will be noted that a single atomic clock 270 is used for both the base station transmitter 120" and the base station receiver 160" so that these units are synchronized. The phase difference signal on line 189" is received by an encoder 272 which outputs a digital signal on line 140" indicative of the phase difference. Line 140" supplies this digital signal to the modulo-2 adder of transmitter 120" so that the phase difference signal is transmitted as data on the spread spectrum signal.

In operation, phase adjustment circuit 262 is controlled so that the phase of a transmitted signal from mobile station 106 should be received by base station 100 in synchronism with the base station clock. Any phase difference is indicative of a phasing error in the mobile station. The phase difference detected by base station 100 is transmitted as data back to mobile station 106. This phae difference signal is decoded by phase correction circuit 266 which corrects the range display circuit 188' and also adjusts the phase adjustment circuit 262 until the phase of the signal transmitted by transmitter 120' is proper.

FIG. 10 shows the operation of the circuit of FIG. 11 more clearly both for acquiring an initial range indication and for correction for clock drift.

In FIG. 10, step (a) depicts the state of the base station and mobile station at the point in time that the mobile station acquires the base station signal as indicated by arrow 300. The base station clock standard is depicted by STD and phasor 302 indicates the phase of the base station transmitter. Phasor 304 indicates the phase of the receiver signal at the time of lock-on. Phasor 304 and phasor 302 are separated by a distance $\gamma$ which is an arbitrary mobile-base standards phase difference and also by a phase $\delta$ which is the local standard-locked receiver phase difference at lock. The receiver phase 304 is then transferred to the transmitter as depicted by arrow 306 in step (b) and by phasor 308. Accordingly, the signal transmitted by the mobile station transmitter has a phase which is the same as the signal received by the mobile station receiver. When the base station receives this signal, the base station receiver phase is indicated by phasor 310. The phase difference $\Delta\beta$ between the base station standard and phasor 310 is then encoded and transmitted as data to the mobile station. In the particular case shown in Step B of FIG. 10, phasor 310 lags the base station standard and thus, when the mobile station receives the data signal, as indicated by arrow 312 in step (c), the transmitter phase is advanced by $\Delta\beta$. The new signal is transmitted to the base station and Step (c) is repeated until $\Delta\beta$ is equal to zero.

Initially, the lane counter is at zero. When, in Step (c) of FIG. 10, the transmitter phase is advanced, the lane counter is incremented by one half of the increase in the transmitter phase. In other words, for each phase advance of the transmitter of $2\alpha$, the lane counter should be advanced by $\alpha$. Once synchronization has been obtained in Step (c) of FIG. 10, the mobile station transmitter is turned off. At this time, the range is measured in accordance with the discussion above of FIG. 6. For each increase in the phase difference detected by the mobile station receiver, the phase of the receiver is increased, the lane count is increased by an equal amount, and the phase of the transmitter is decreased by a similar amount. Periodically, the mobile station transmitter is activated to check the lane count. As long as the phase of the transmitter is decreased for each phase increase seen by the receiver, $\Delta\beta$ sensed by the base station receiver will be zero.

Occassionally, the mobile clock will drift slightly. If the mobile standard phase decreases by an amount $\Delta\epsilon$, the system will interpret the change as if position changed. Thus, the receiver phase will be incremented by $\Delta\epsilon$, the lane counter will be incremented by $\Delta\epsilon$, and the transmitter phase will be decremented by $\Delta\epsilon$. Thus, on the next transmission of the mobile station to the base station, $\Delta\beta$ will be low by $2\Delta\epsilon$. Conversely, if the base standard phase decreases by $\Delta\epsilon$, the system will decrement the receiver phase by $\Delta\epsilon$, decrement the lane counter by $\Delta\epsilon$, and increment the transmitter phase by $\Delta\epsilon$, thus leaving $\Delta\beta$ low by $2\Delta\epsilon$; thus, in either case, for clock drift correction, if $\Delta\beta$ is low by $2\Delta\epsilon$, the lane counter is decremented by $\Delta\epsilon$ and the transmitter phase is incremented by $2\Delta\epsilon$. No change is necessary for the receiver.

For the foregoing, it can be seen that the steps of FIG. 10 as implemented in the circuit of FIG. 11 can be used to acquire original range information as well as correct for relative base station to mobile station clock drift. It should be noted that this procedure must be performed by each mobile station for each of the base stations. It will also be noted that since the base station phase is never changed, each mobile station can acquire and track the base stations without affecting ranging information of other mobile stations in any way.

Because the roundtrip ranging mode described in FIG. 10 can only be performed by a single mobile station at a time, provision may be included to "time sequence" the roundtrip mode in a cooperative sense among the users. In this regard, during its T cycle, each base station may transmit an "idle" message to all users when that base station is not busy. Thus, no users will attempt to obtain control of the base station unless it is in the idle mode.

The system can also be designed for a single user mode of operation. When only one user exists, it is not necessary for the base station to keep its signal unperturbed. It can adjust to meet the requirements imposed by the mobile station in a round trip ranging operation. In this case, the mobile transmitter, phase locked to the mobile clock at a known point, transmits a single which is in turn received by the base station. The base station, which is now locked onto the mobile transmitter, measures its phase with respect to the local cesium standard. This measurement is then used by the base microprocessor to adjust the phase of the base transmitter, again referenced to the same standard, by the same amount. There is thus now no phase difference between the incoming "received" wave and the outgoing "transmitted wave," except for the highly accurate T/R cycle delay, which is an integral number of carrier cycles. The receipt, therefore, of the return base signal at the mobile will result in a "round trip" phase delay equal to the difference between the original mobile transmitter phase and the received signal at the mobile from the base. As with all two-way systems of this type, the equivalent lane width is one-half that of a one-way system.

Other possible modifications to the system include the use of an acquisition code which is a coarse (63 bit) code whose reception and lock-on significantly reduce the acquisition time for each of the mobile stations to synchronize with the base stations. In addition, the system may include remote control provisions and the modulo-2 adders of the transmitters may be used to establish data channels for information communication. These provisions can allow users to have knowledge of the system status, to effect control over base station operations and to exchange data with themselves or third parties. These data channels can also be used for supplemental navigation information, e.g., satellite translocation data provided by the GPS system when it becomes available, or other navigation systems.

It should be understood that the present invention can best be carried out by performing the various functions described above with a programmed microprocessor. Accordingly, flow charts describing the various control programs necessary for the base and mobile stations will now be described.

DESCRIPTION OF FLOW DIAGRAMS

Figure 14:
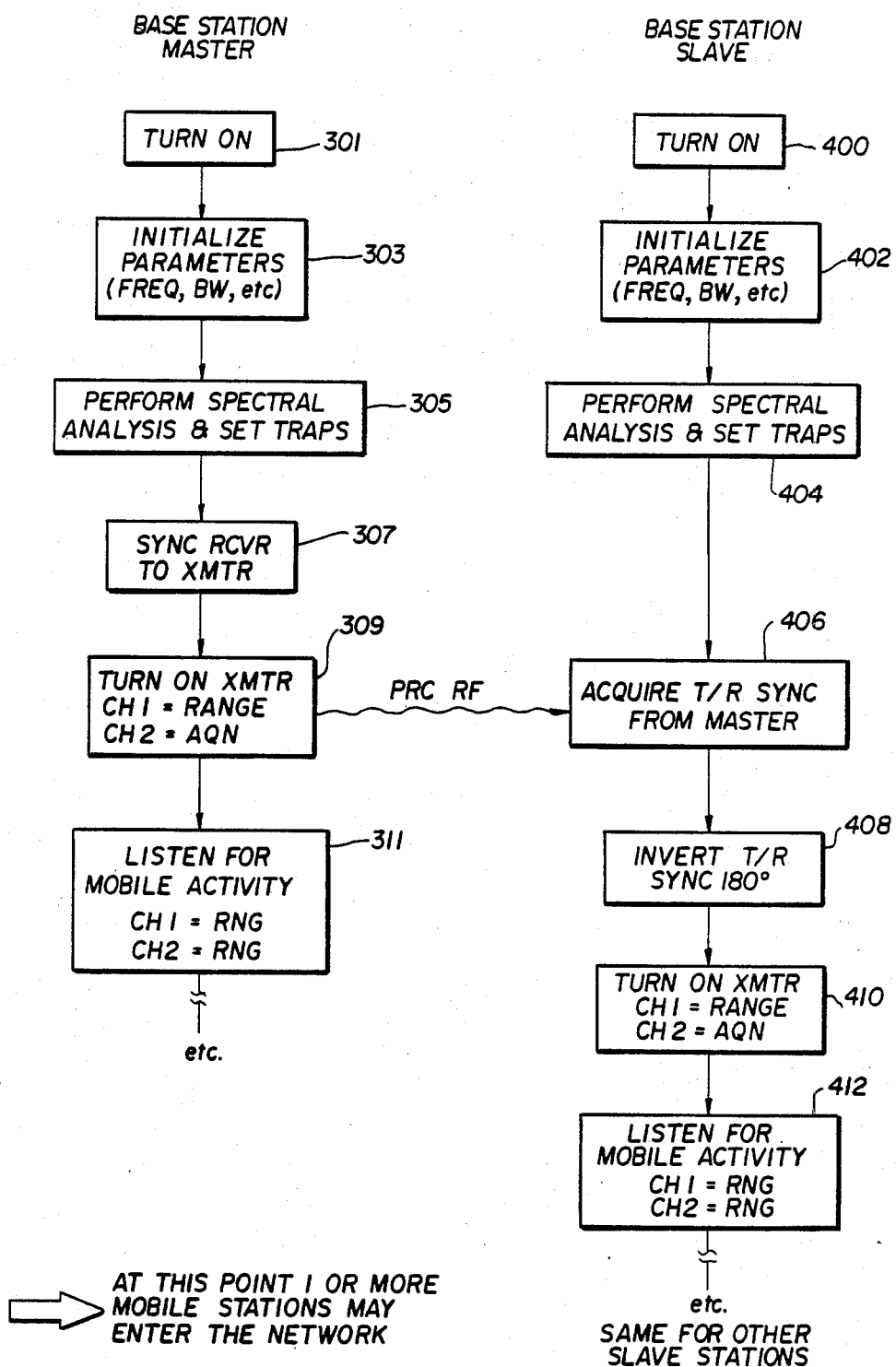
FIG. 14 is a flow diagram depicting turn-on and synchronization of the slave base station with the master base station.

FIG. 14 shows a flow diagram for turning on the master and slave base stations and synchronizing the base stations. Step 301 indicates turning on of the master base station and is followed by step 303 in which the parameters are initialized. This include setting the frequency of the various channels to their assigned frequencies, as discussed above, setting the band width of the transmitters and receivers, etc. Step 305 comprises setting the traps of the master station receivers by performing spectral analysis and setting the parameters of the associated notch filters, as discussed above with regard to FIG. 8. This procedure will be discussed in further detail herein below.

Step 307 comprises synchronizing the master station receiver to the master station transmitter. This comprises setting the T/R cycle so that the transmitter and receiver operator 180 degrees out of the phase in accordance with the predetermined T/R cycle, as discussed above. Control then passes to step 309 in which the transmitter is turned on. Channel 1 of the transmitter is set to transmit the range code and channel 2 is set to transmit the acquisition code. The range code is the 2047 bit code discussed above. For the slave base stations and the mobile station to lock on to this code directly would take an inordinate length of time. Accordingly, channel 2 transmits an acquisition code. The acquisition code is a 63 bit code which is substantially coarser than the range code so as to significantly reduce the time required to search and lock on to the range code. The 63 bit acquisition code is transmitted 8 times during each T cycle.

After the transmitter is turned on, control passes to step 311 in which the receiver is turned on to listen for signals transmitted by the mobile stations.

Step 400 indicates the turn-on of a slave base station. It should be noted that the sequence to follow will be performed by each of the slave base stations. Step 402 indicates initialization of the parameters, as was done in step 303 for the master base station. At step 402, the slave base station performs spectral analysis and sets its traps, and at step 406 the slave base station acquires the T/R synchronization from the master base station as discussed above. The flow diagram for this procedure will be discussed further herein below.

After the T/R synchronization is acquired, the T/R synchronization of the slave base station is inverted so that the transmit period of the slave base station will coincide with the transmit period of the master base station. Next, at step 408, the slave station turns on its transmitter with channel 1 transmitting the range code of that particular base station and channel 2 transmitting the acquisition code assigned to that base station. At step 412, the receiver of that base station listens for signals from the mobile stations.

Figure 15:
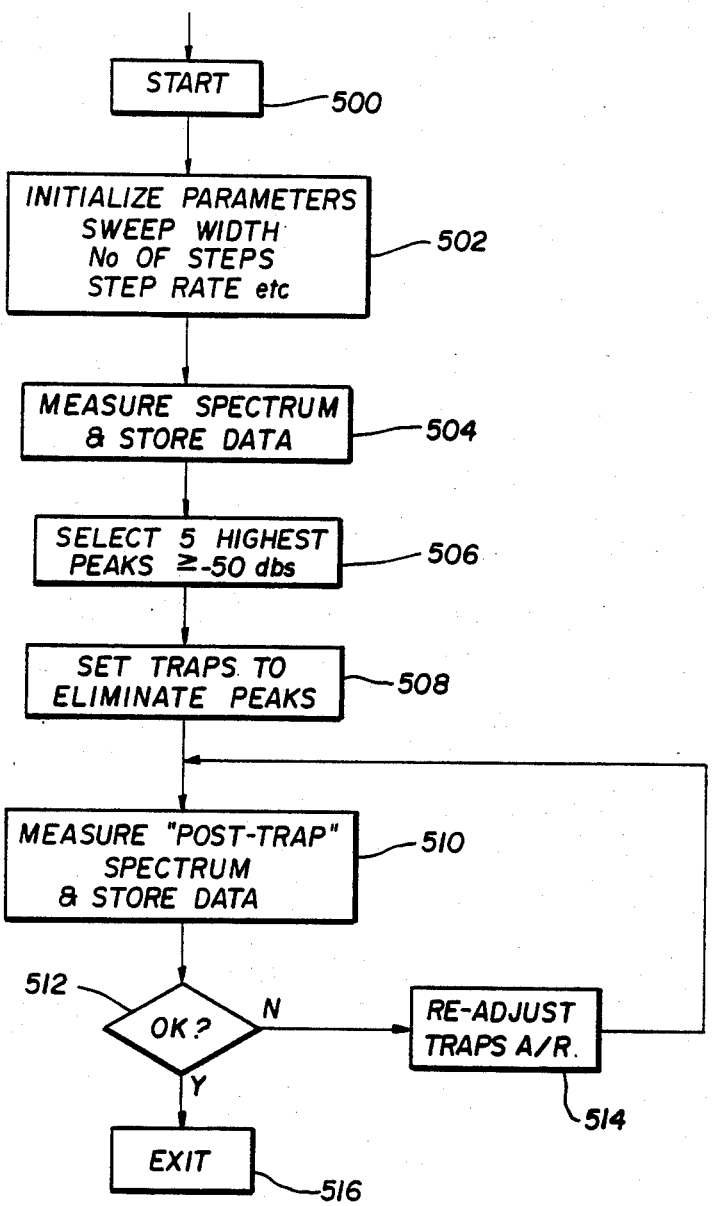
FIG. 15 is a flow diagram showing the spectral analysis and trap set procedure.

FIG. 15 sets forth the spectral analysis and trap set procedures carried out in steps 305 and 404 of FIG. 14. The spectral analysis and trap set procedure is entered at step 500. At step 502, the parameters are initialized.

These parameters include the sweep width, number of steps, step rate, etc. if the frequency band to be analyzed. At step 504, the spectrum of the signals received on the antenna is analyzed and data is stored relative to spectral peaks. At step 506, the five highest spectral peaks which exteed −50 dbm are selected and at step 508, the traps, in the form of notch filters, are set to eliminate these peaks. It will be noted that more or less traps may be used as desired. At step 510, the spectrum of the received signal is again measured and information relating to the peaks is again stored. At step 512, the data stored in step 512 is compared is to the data stored in step 504. If the five highest peaks have not been eliminated, control passes to step 514 where the traps are readjusted. Thereafter, control returns to step 510 where the spectrum is again measured and the results compared at step 512. This loop is repeated until the five peaks selected at step 506 are eliminated. Once the traps are properly set, the routine exits at step 516. It will be understood that the selection of five peaks is arbitrary. More or less peaks can be eliminated, as desired.

It will be recalled that the positioning of a notch filler is shown in FIG. 8 together with the connections for the frequency selection circuitry. The specific construction of notch filters which can be used as traps according to the present invention is well known and details thereof will not be presented here. Also, spectral analysis routines are well known and will not be discussed in detail here.

FIG. 16 sets forth the routine for acquiring T/R synchronization as performed in step 406 in FIG. 14.

The synchronization acquire routine is entered at step 600. At step 602 the slave base station is set to receive the acquisition code transmitted on channel 2 of the master base station. It is noted that FIG. 16 is a general flow chart for T/R synchronization which applies to both the slave base station and the mobile base stations. In the case of the slave base stations, only the signal from the master base station will be checked. In the case of the mobile stations, the acquistion signal from each of the base stations is measured at step 602 and the strongest signal is chosen at step 604. At step 606, the signal strength is compared to a threshold level which indicates that the signal strength is adequate to proceed. If the signal strength is not sufficient, the T/R timing of the receiving station is flipped by 180 degrees at step 608. The reason for this is that, clearly, if the transmit portion of the T/R cycle of the receiving station is no more than 90 degrees out of phase with the transit portion of the T/R cycle of the transmitting station, the average received signal will be weak. Therefore, inverting the T/R cycle of the receiving station will increases the overlap between the receive portion of the T/R cycle of the receiving station and the transmit portion of the T/R cycle of the transmitting station, thereby enhancing the average received signal strength.

Control passes from step 608 to step 602 where each mobile station again checks the signal strength of the acquisition signal of each base station. Step 604 causes the strongest base station to be sensed, the signal of which should now be greater than the threshold set in step 606.

Control then passes to step 609 where the acquisition code on the strongest station is acquired. This is accomplished, as discussed above, by cross-correlating the received signal with a locally generated form of the acquisition code. The local signal is stepped one half chip at a time until a correlation peak is achieved. Software for performing cross-correlation of this nature is well known and will not be discussed in detail here. Once the acquisition code is aquired, control passes to step 610.

Figure 12:
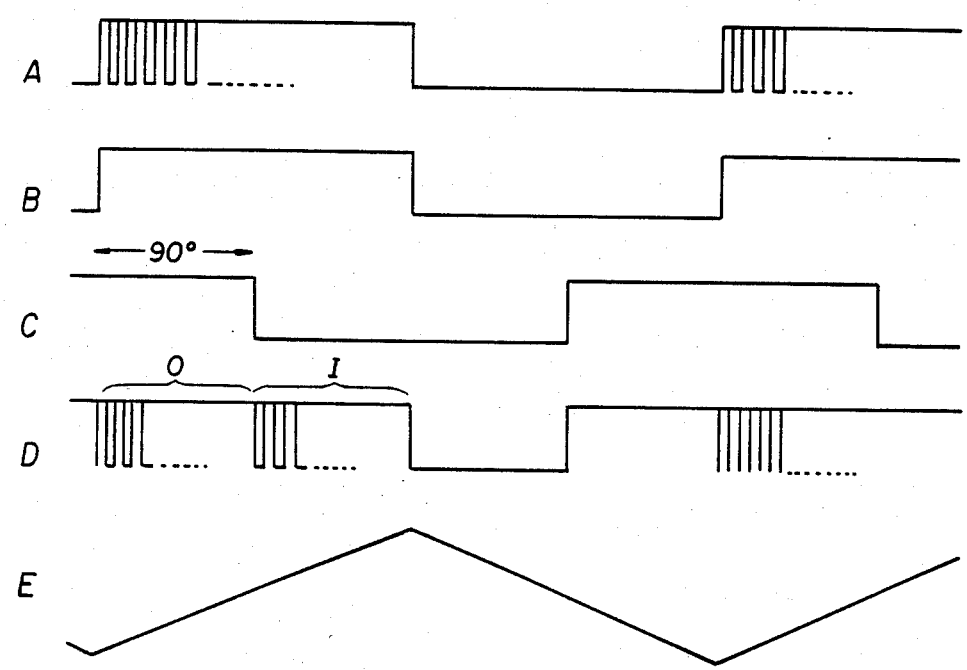
FIG. 12 is a timing diagram showing the signals used for acquiring T/R synchronization.
Figure 13:
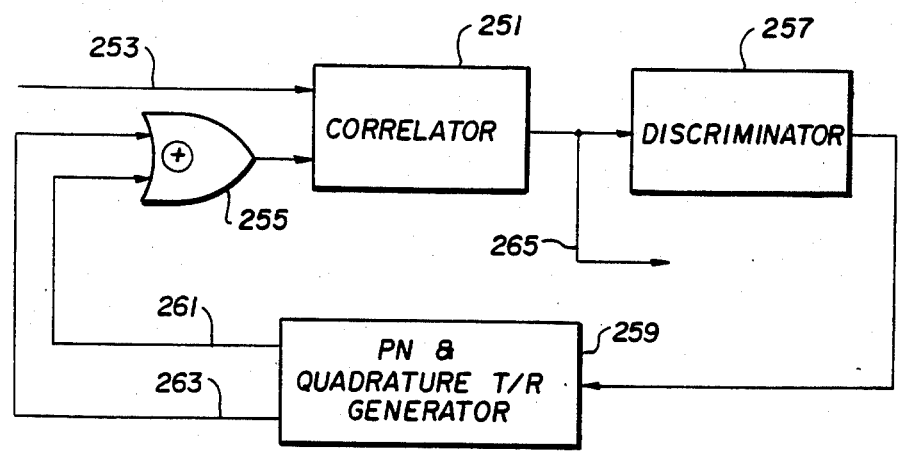
FIG. 13 is a block diagram depicting the operation for acquiring T/R synchronization.

In step 610 the local signal is modified as discussed above in connection with FIG. 12. That is, the locally generated acquisition code at the T/R cycle is exclusively OR'd with a T/R signal shifted by 90 degrees. This signal is then cross-correlated with the received signal in a phased locked loop comprising steps 612 and 614. The sequence is equivalent to that discussed above relative to FIG. 13. In step 614, the locally generated signal is cross-correlated with the received signal and the result is checked to see if a NULL condition exists. If a NULL does not exits, control is passed to step 612 where, dependng on whether the result of the cross-correlation is above or below the NULL point, the locally generated signal is stepped either forward or backward. This stepping takes place one code length at a time to reduce acquisition time. If a NULL condition exists indicating that the tracking point has been achieved at step 614, control passes to step 616. At this point, T/R synchronization has been achieved and any other receivers at the receiving station are similarly synchronized. The control then passes to step 618 where the routine is ended and the program branches back to the main routine.

After the base stations have been turned on and synchronized, as discussed above in relation to FIG. 14, the mobile stations may be turned on. FIG. 17 shows the basic control routine for starting up a mobile station. It will be understood that these same preocedures are to be followed for each mobile station. The mobile station is turned on at sep 700 and its parameters are initialized at step 702. Spectral analysis and trap setting procedures are performed at step 704 in accordance with the routine shown in FIG. 15. At step 706, T/R sycnhronization is acquired in accordance with the routine in FIG. 16. At step 708, the acquisition code for each base station is acquired. The purpose of this step is to obtain a rough estimate of the timing of the ranging code. It will be recalled that each base station has two transmitting channels. On one channel, the range code is transmitted and on the other channel, the acquisition code is transmitted. These codes are in phase with each other so that aquisition of the acquisition code provides an estimate of the timing of the range code. The acquisition code is acquired by cross-correlating the received acquisition code with a locally generated duplicate of the acquisition code for the base station being received. A cross-correlation peak indicates that the locally generated acquisition code is in phase with the received acquistion code. This accomplished for each base station and, when step 708 is completed, control passes to step 710 where the range code for each base station is acquired. Each mobile station produces a locally generated duplicate of the range code of each base station. These locally generated signals are in phase with the locally generated acquisition signals so that, after step 708, the local range codes are roughly in phase with the received range codes. Cross-correlation is performed to obtain exact coincidence. A cross-correlation peak indicates that coincidence is achieved. Again, this step is repeated for the range code from each base station.

Upon completion of step 710, control passes to step 712 where the range tracking routines are initiated. As discussed above with reference to FIG. 6, the range tracking routines produce in-phase and quadrature-phase detection of each received carrier signal relative to a corresponding locally generated signal. In response to the phase difference detected, the locally generated signals are phase adjusted to be inphase with corresponding received carrier signal. Phase detectors and phase lock loop systems are well known to those with ordinary skill in the art.

From step 712, control passes to step 714 where the range to each base station is calibrated. An initial range for each base station may be made by positioning the mobile station in a known location and inputting the coordinates of that known location. Alternatively, a round trip ranging procedure may be initiated, as discussed below. Once the initial ranges are known, these ranges are updated in accordance with the phase adjustments produced in the range tracking routines of step 712, as discussed above with reference to FIGS. 6 and 10. For each phase difference detected, the lane counter is increased or decreased by a corresponding amount. Furthermore, in order to prepare for a round trip ranging procedure, the phase of the associated transmitter channel is adjusted also. If an increase in phase difference is detected by the tracking routines of step 712, the lane counter is incremented and the transmitter channel phase is decremented.

At 716, the routines for determining the exact position of a mobile station based on the ranges from the base station are carried out. These routines are also well known to those of ordinary skill in the art and will not be discussed here. The results of these calculations are displayed and passed to a printer where a hard copy is produeed at step 718.

Figure 18B:
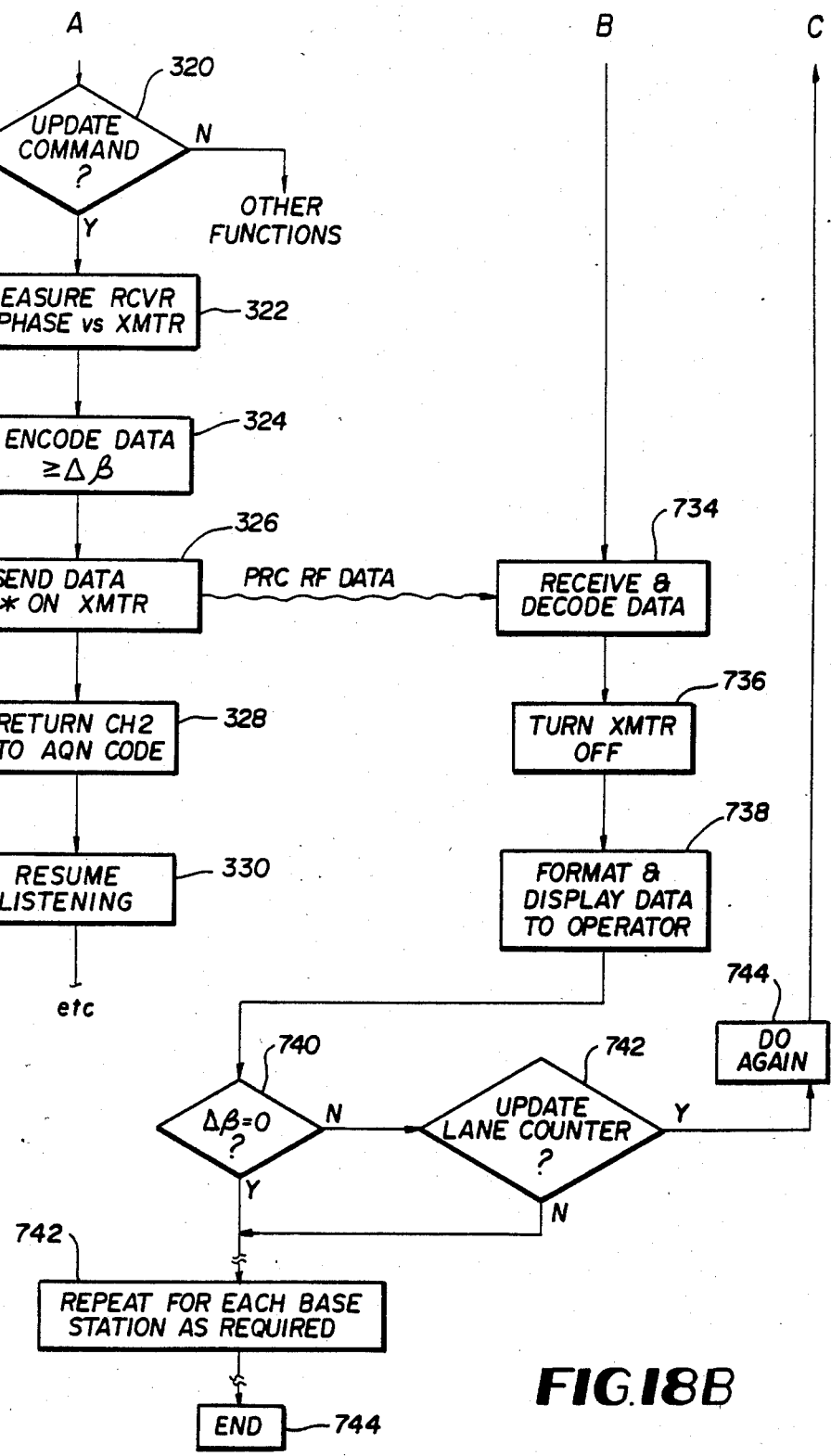

Now, the reference to FIGS. 18A and 18B, a round trip ranging procedure will be discussed. As shown in FIG. 18A, the mobile station (any mobile station) will normally be performing the navigating routines discussed in FIG. 17. At step 18, an operator requests an update by inputting an update request signal to the system. At step 720, the mobile station listens for activity from the base station which is to be communicated with in order to determine whether that base station is communicating with another mobile station. If the bse station is free, as indicated by transmission of its acquisition code, control passes to step 722 where the update is initiated. Next, control passes to step 724 where the transmitter and receiver channels to be utilized are synchronized. Once synchronization is complete, step 726 is carried out where the phase of the transmitted signal is advanced by two times the current lane count. Next, at step 728 the transmitter is turned on with both channels transmitting range codes to enable data transmission to be carried out. At step 730, the mobile station waits two minutes for the base station to lock on.

Meanwhile, the base station (any base station) listens for mobile activity at step 310 as discussed in connection with the master base station in FIG. 14. At step 312, the base station senses the range code transmitted by the mobile station and locks on to the code. At step 314, the base station synchronizes its transmitter and receiver channels to be used. At step 316, channel 2 of the base station is set to transmit the range code. At step 732, the mobile station transmits a unique identity code and an update command indicsating that the round trip ranging mode should be initiated. At step 318, tthe base station receives the identification data and the update command information and at step 320, the base station determines that the received command is an update command and passes control to step 322 where the phase of the received signal is compared to the phse of the signal being transmitted. Due to the mobile station advancing its transmitter phase by two times the lane count in step 726, the signal received by the base station should be exactly that of the signal being transmitted by the base station unless the lane count of the mobile station is in error. At step 324, the base station encodes data indicated of the measured phase difference obtained in step 322 and encodes this data as $\Delta\beta$. At step 326, the transmitter transmits its pseudorandom code with the $\Delta\beta$ data as well as the mobile station ID code and then returns channel 2 to the acquisition code at step 328 and resumes listening at step 330.

At step 734, the mobile station receives the signal from the base station and decodes the data. At step 736 the mobile station transmitter is turned off. At step 738, the data is formatted and displayed to the operator. The data indicates the phase error of the mobile station lane count, if any. At step 740, the $\Delta\beta$ data which has been decoded is compared to zero. If $\Delta\beta$ equals zero, control is passed to step 742 where the routine is repeated for each base station. If $\Delta\beta$ does not equal zero, the lane counter is updated at step 742 and the routine is entered again at step 744. This procedure continues until $\Delta\beta$ equals zero.

If, at step 742, the error in $\Delta\beta$ is so small that updating the lane counter is not necessary, the operator may command that control passes back to sep 742. A display and manual input may be provided for this purpose.

After step 742 is completed, the control passes out of the subroutine at step 744.

The foregoing description is provided for purposes of illustrating the present invention. However, this description is not considered to be exhaustive of the possible modifications which could be made to the present invention. Clearly, numerous additions, substituents and other modifications can be made without departing from the scope of the invention, as set forth in the appended claims.

What is claimed is:

1. A system for enabling a mobile station to make position determinations relative to at least two base stations, comprising:
   at lest two stationary base stations, each said base station comprising:
   a base station clock having a predetermined timing;
   means synchronized with said base station clock for transmitting a spread spectrum signal having a timing indicative having a ground wave component and a sky wave component, said spread spectrum signal having a repetition time at least as great as a maximum anticipated delay time of said spread spectrum signal sky wave component whereby said ground wave component of said transmitted spread spectrum signal can be distinguished from said sky wave component of said spread spectrum signal;
   at least one mobile station comprising:
   a mobile station clock synchronized with said base station clock;
   detection means for receiving said spread spectrum signal, despreading said received signal and outputting a detected despread signal;
   means for receiving said detected despread signal and comparing said timing to the timing of said mobile station clock for producing a phase difference signal indicative of range from said base station;

wherein each said base station spread spectrum signal is at a different frequency, whereby a plurality of ranges can be determined simultaneously from said individual base stations and used to determine location of said mobile station by calculating a range to each of said base stations.

2. A system as set forth in claim 1, wherein said means for transmitting comprises means for generating a pseudorandom noise code, means for generating a carrier signal, and means for modulating said carrier signal with said pseudorandom noise code.

3. A system as set forth in claim 2, wherein said carrier signal is at a frequency in the range 1 MHz to 4 MHz.

4. A system as set forth in claim 2, wherein said detection means comprises means for duplicating said pseudorandom noise code, and means for cross correlating said receiver spread spectrum signal with said duplicated pseudorandom noise code.

5. A system as set forth in claim 2, wherein said pseudorandom noise code has a chip time less than the minimum expected delay time of said sky wave component.

6. A system as set forth in claim 2, wherein said detection means include a notch filter for filtering out narrow band interference in said received signal, and means for analyzing said received signal and matching the stopband of said notch filter to said narrow band interference.

7. A system as set forth in claim 2, wherein said pseudorandom noise code has an unambiguous length not less than one fourth of the maximum expected range to be measured.

8. A system as set forth in claim 2, wherein said pseudorandom noise code has an unambiguous length not less than the maximum expected range to be measured.

9. A system as set forth in claim 2, wherein said pseudorandom noise code has an unambiguous length of approximately 400 miles.

10. A system as set forth in claim 2 including means for adding digital communication data to said pseudorandom noise code and said detection means includes means for identifying said digital communication data.

11. A system as set forth in claim 10, wherein said adding means produces a phase shift of said transmitted signal to distinguish each bit of said digital communication data, and said means for identifying said digital communication data comprises a phase detector.

12. A system as set forth in claim 10, wherein said mobile station includes a mobile station transmitter, each said base station includes a base station receiver tuned to receive signals transmitted by the mobile station transmitter.

13. A system as set forth in claim 12, wherein said mobile station transmitter is operative to transmit a signal to said base station receiver indicative of the timing of said mobile station clock, said base station including means for comparing the phase of said mobile station timing with the phase of said base station clock and generating a signal indicative of the phase difference therebetween, said adding means being connected to receive said phase difference signal and to transmit said phase difference signal to said mobile station whereby said mobile station is able to maintain accurate synchronization between said mobile station clock and said based station clock and obtain a round trip determination of range.

14. A system as set forth in claim 12, wherein each mobile station transmitter transmits a pseudorandom noise code at a different frequency than the pseudorandom noise codes transmitted by said base stations.

15. A system as set forth in claim 10, wherein said base station includes a base station receiver for receiving signals from said mobile station, said transmitting means including means for transmitting said spread spectrum signal only during transmit periods of a predetermined length, said transmit periods being followed by receive periods during which said base station is capable of receiving on said base station receiver.

16. A system as set forth in claim 15, wherein each said transmit period has an duration equal to a plurality of repetition times of said spread spectrum signal.

17. A system as set forth in claim 16, wherein each said transmit period is equal to approximately 8 of said repetition times.

18. A system as set forth in claim 15, wherein said mobile station includes a transmitter for transmitting to said base station receiver and wherein said mobile station includes means establishing transmit periods for permitting signal transmissions and establishing receive periods for permitting signal reception, said mobile station transmit and receive periods being 180 degrees out of phase with said base station transmit and receive periods.

19. A system as set forth in claim 18 including means for synchronizing said base station transmit and receive periods with said mobile station transmit and receive periods, said synchronization means comprising means for correlating said pseudorandom code transmitted by said base station with a locally generated duplicate of said pseudorandom code having portion in phase with said transmitted pseudorandom code and having a portion out of phase with said transmitted pseudorandomm code to produce a predetermined correlation function when synchronization occurs.

20. A system as set forth in claim 19 further including means for varying the rate of said locally generated duplicate of said pseudorandom code in response to the output of said correlating means.

21. A system as set forth in claim 2, wherein the pseudorandom noise codes for esach of said base statiins have similar chip times.

22. A system as set forth in claim 21, wherein the carrier frequencies for said base stations are different from each other and are chosen such that each transmitted spread spectrum signal has spectral lines which are different from the spectral lines of the other spread spectrum signals.

23. A system as set forth in claim 1, wherein said carrier signal frequency is less than 60 MHz.

24. A method for enabling a mobile station to make position determinations relative to at least two stationary base stations, comprising:

at each base station, transmitting a spread spectrum signal having a predetermined timing, having a ground wave component and a sky wave component, and having a repetition time at least as great as a maximum anticipated delay time of said sky wave component; and at said mobile station, detecting said spread spectrum signal, despreading said spread spectrum signal, and comparing the timing of said despread signal to a locally generated timing signal for producing a phase difference signal indicative of the range of said base station;

wherein each base station spread spectrum signal is transmitted at a different frequency and said mobile station determines a separate range from each base station to determine a location of said mobile station.

25. A method as set forth in claim 24, wherein the step of transmitting comprises generating a pseudorandom noise code, generating a carrier signal, and modulating the carrier signal with the pseudorandom noise code.

26. A method as set forth in claim 25 including the step of generating said pseudorandom noise code with a chip time less than the minimum expected delay time of said sky wave component.

27. A method as set forth in claim 25 including the step of generating said carrier signal at a frequency in the range of 1 MHz to 4 MHz.

28. A system as set forth in claim 25, wherein the step of detecting comprises duplicating the pseudorandom noise code and cross correlating the spread spectrum signal with the duplicated pseudorandom noise code.

29. A method as set forth in claim 25 including, at each mobile station, analysing received signals and filtering out any narrow band interference in the received signals prior to detection.

30. A method as set forth in claim 25, wherein said pseudorandom noise code is generated with a length not less than one fourth of the maximum expected range to be measured.

31. A method as set forth in claim 25, wherein the pseudorandom noise code is generated with an unambiguous length not less than the maximum expected range to be measured.

32. A method as set forth in claim 25 including the step of adding digital communication data to the pseudorandom noise code prior to transmission and wherein the step of detecting includes identifying the digital communication data.

33. A method as set forth in claim 32, wherein the step of adding comprises producing a phase shift of the pseudorandom noise code to distinguish each bit of the digital communication data, and wherein the step of detecting the digital communication data comprises detecting a phase shift.

34. A method as set forth in claim 32 including, for said mobile station, transmitting a signal to each base station receiver indicative of the timing of said mobile station, and including, at each base station, the step of comparing the phase of the mobile station timing signals with the phase of the signal transmitted by that base station, generating a signal indicative of the phase difference therebetween, and adding the phase difference signal to the transmitted signal.

35. A method as set forth in claim 34 including, at said mobile station, adjusting the ranging information derived by said mobile station in response to a received phase difference signal from a base station.

36. A system as set forth in claim 32, wherein said mobile station transmits a pseudorandom noise code at a frequency different from the pseudorandom noise code transmitted by the base stations.

37. A method as set forth in claim 32, wherein each base station receives signals from said mobile station and transmits spread spectrum signals only during transmit periods of a predetermined length and receives signals only during receive periods of a predetermined length.

38. A method as set forth in claim 37, wherein the transmit periods have a duration equal to a plurality of repetition times oof the spread spectrum signal.

39. A method as set forth in claim 37, wherein the mobile station transmits signals to the base stations and wherein transmit periods for the mobile station are established followed by receive periods for the mobile station, and wherein the mobile station receive periods and transmit periods are 180 degrees out of phase with the base station receive periods and transmit periods.

40. A method as set forth in claim 19 including synchronizing the base station transmit and receive periods with the mobile station transmit and receive periods by correlating the pseudorandom code transmitted by the base station with a locally generated duplicate of the pseudorandom code which has a portion in phase with the transmitted pseudorandom code and a portion out of phase with the transmitted pseudorandom code to produce a predetermined correlation function indicative of synchronization.

41. A method as set forth in claim 40 further including varying the rate of said locally generated duplicate in response to said correlation function.

* * * * *